C. R. HOUGHTON.
RELIEF VALVE.
APPLICATION FILED SEPT. 28, 1912.
1,087,906.
Patented Feb. 17, 1914.
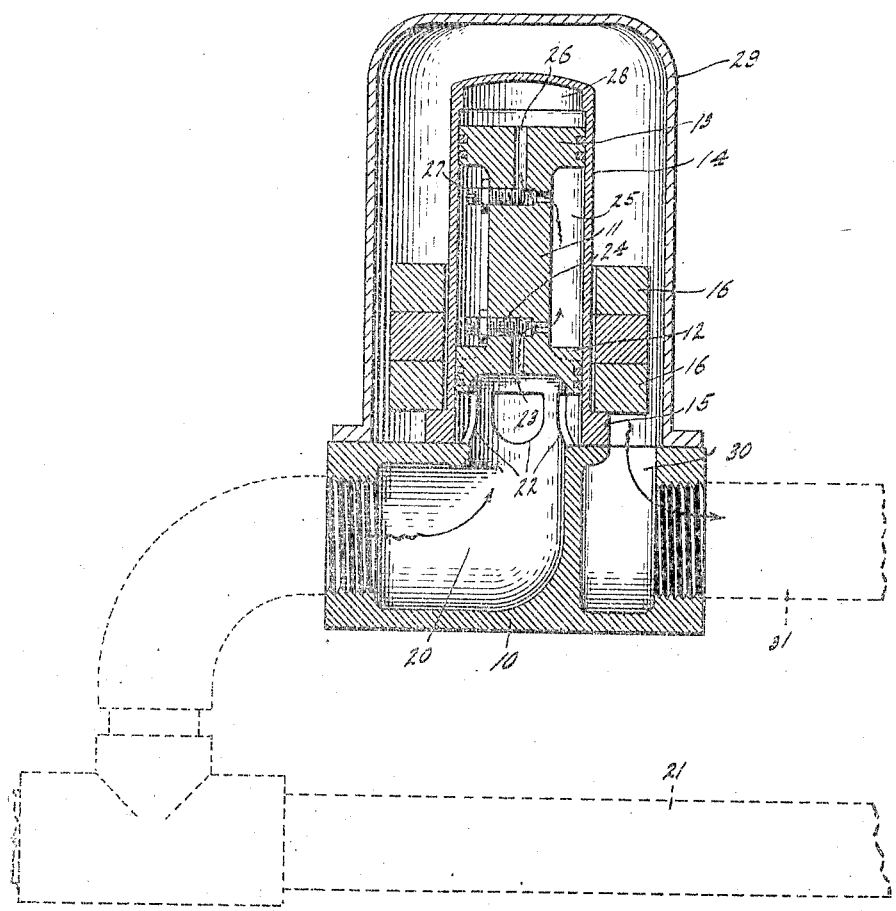
Witnesses
Frank A. Fahle
May Layden
Inventor
Carl Roy Houghton,
by
Arthur M. Good
Attorney

UNITED STATES PATENT OFFICE.

CARL ROY HOUGHTON, OF CONNERSVILLE, INDIANA, ASSIGNOR TO THE CONNERSVILLE BLOWER COMPANY, OF CONNERSVILLE, INDIANA, A CORPORATION OF INDIANA.

RELIEF-VALVE.

1,087,906.   Specification of Letters Patent.   Patented Feb. 17, 1914.

Application filed September 23, 1912. Serial No. 722,784.

*To all whom it may concern:*

Be it known that I, CARL ROY HOUGHTON, a citizen of the United States, residing at Connersville, in the county of Fayette and State of Indiana, have invented a new and useful Relief-Valve, of which the following is a specification.

In the ordinary relief valve, the opening of the valve upon the excessive pressure condition to be guarded against causes an immediate diminution of such pressure condition and allows the valve to close directly after it is opened, the closing in turn causing an increase in the pressure condition and a reopening of the valve. This produces a bouncing of the valve which is very objectionable.

It is the object of my present invention to provide a relief valve in which this bouncing is eliminated. This is accomplished by making the valve responsive to the pressure in a chamber having a restricted entrance and exit, so that the pressure in such chamber can vary only in a gradual manner. By this means the variation in pressure due to the opening or closing of the relief valve does not produce an immediate closing or opening of the valve.

The single figure of the drawing illustrates a preferred form of my invention.

The base 10 of the relief valve has a central upward projection 11 which has two spaced piston heads 12 and 13 fitting the inside of a vertically movable cylinder 14. This cylinder has a flange 15 for supporting a suitable number of annular adjusting weights 16, whereby the pressure to which the valve is responsive may be controlled. The lower end of the projection 11 is hollow for some distance above the base 10, and opens into a chamber 20 in such base. This chamber, in the pressure relief valve shown, is suitably connected to the pipe 21 or other device within which excessive pressure is to be guarded against. The lower hollow part of the projection 11 has a number of circumferential openings 22, preferably narrower at the bottom than at the top, which openings are normally closed by the cylinder 14. From the upper end of the lower hollow part of the projection 11 a passageway 23, provided with an adjusting screw 24, leads to the annular space 25 between the two piston heads 12 and 13; and similar passage 26, provided with an adjusting screw 27, leads from such annular space 25 to the chamber 28 between the piston head 13 and the closed upper end of the cylinder 14. A cap 29 incloses the other parts resting on the base 10, the space within said cap opening to a chamber 30 within the base 10. This chamber may be connected, by a pipe 31, to any suitable discharge point, if desired.

As the pressure within the pipe 21 rises, the fluid under the increased pressure forces its way slowly through the passages 23 and 26 into the chamber 28, and there, acting against the inside upper end of the cylinder 14, gradually raises such cylinder as the pressure in such chamber attains the desired maximum pressure to which it is desired the valve be responsive. This pressure may be adjusted by the weights 16. As the cylinder 14 rises, it uncovers the openings 22, thereby allowing the escape of fluid from the pipe 21 through the chamber 20 and the openings 22 into the space within the cap 29, and thence through the chamber 30 and pipe 31 to a suitable discharge point. While the uncovering of the openings 22 may produce a diminution of the pressure within the chamber 20, such diminution is practically without immediate effect on the pressure within the chamber 28; however, the pressure in the chamber 28 tends to equalize itself with the pressure in the chamber 20, and does so slowly as the fluid passes through the restricted passages 26 and 23. Thus the movement of the cylinder 14, both upward and downward, is a slow one, and there is absolutely no bouncing.

The construction shown provides for the discharge of the fluid from the relief valve at a point which may be remote from the valve itself, as may be desirable in the case of noxious gases. The remote discharge also largely eliminates the noise of operation of the valve. When there is no necessity for removing the discharge to a remote point, as in compressed air systems in case the noise of discharge at the relief valve is not objectionable, the pipe 31 and the cap 29 may be omitted; indeed, the whole base 10 may be omitted and the hollow lower end of the projection 11 connected directly to the pressure pipe 21.

While I have described my invention as particularly applied to pressure relief valves, it is equally applicable to the relief of excessive pressure conditions whether such conditions be positive or negative as compared with the normal pressure, such as atmospheric pressure. Therefore, in the claims I aim to cover a relief valve applicable for excessive pressure conditions generally.

I claim as my invention:

1. A relief valve, comprising two relatively movable members one of which is provided with openings which are covered or uncovered by such movement and which when uncovered afford relief for the pressure condition to which the valve is to be responsive, said valve being provided with an expansible chamber controlling the relative movement of said members, and said chamber being provided with an adjustable restricted exhaust and entrance passageway having an intermediate, greatly enlarged portion.

2. A relief valve, comprising two relatively movable members one of which is provided with openings which are covered or uncovered by such movement and which when uncovered afford relief for the pressure condition to which the valve is to be responsive, said valve being provided with two chambers one of which is expansible and controls the relative movement of said members, said expansible chamber being connected to the other chamber by a restricted passageway and said latter chamber being provided with a restricted exhaust and entrance passageway.

3. A relief valve, comprising two relatively movable members providing between them a chamber the size of which is varied by such movement, such chamber being provided with an adjustable restricted passageway for the entrance and exit of fluid, which passageway has an intermediate, greatly enlarged portion, and one of said members being provided with an opening which is covered and uncovered by such relative movement and which when uncovered provides relief for the pressure condition to which the valve is responsive.

4. A relief valve, comprising two relatively movable members providing between them a chamber the size of which is varied by such movement, said valve also having a second chamber connected with the first by a restricted passageway, such second chamber being provided with a restricted passageway for the entrance and exit of fluid, and one of said members being provided with an opening which is covered and uncovered by such relative movement and which when uncovered provides relief for the pressure condition to which the valve is responsive.

5. A relief valve, comprising two relatively movable members providing between them a chamber the size of which is varied by such movement, said valve also having a second chamber connected with the first by a restricted passageway, such second chamber being provided with an adjustable restricted passageway for the entrance and exit of fluid, and one of said members being provided with an opening which is covered and uncovered by such relative movement and which when uncovered provides relief for the pressure condition to which the valve is responsive, and said second passageway communicating with the fluid container to the pressure in which the valve is responsive.

6. A relief valve, comprising two relatively movable members providing between them a chamber the size of which is varied by such movement, such chamber being provided with a restricted passageway for the entrance and exit of fluid, which passageway has an intermediate, greatly enlarged portion, and one of said members being provided with an opening which is covered and uncovered by such relative movement and which when uncovered provides relief for the pressure condition to which the valve is responsive, and said passageway communicating with the fluid container to the pressure in which the valve is responsive.

7. A relief valve, comprising a relatively movable cylinder and piston providing between them a chamber by the pressure in which the relative movement is obtained, adjustable weights which oppose the movement between the cylinder and piston produced by the pressure in such chamber, said piston being provided with a relief opening which is covered and uncovered by such relative movement, and said chamber being provided with a restricted exit and entrance passageway having an intermediate, greatly enlarged portion, and means for adjusting the effective size of such passageway.

8. A relief valve, comprising a relatively movable cylinder and piston providing between them a chamber by the pressure in which the relative movement is obtained, said piston being provided with a relief opening which is covered and uncovered by such relative movement, said valve also having a second chamber connected to the first by a restricted passageway and said second chamber being provided with a restricted exit and entrance passageway, and means for adjusting the effective size of such exit and entrance passageway.

9. A relief valve, comprising a relatively movable cylinder and piston providing between them a chamber by the pressure in which the relative movement is obtained, and adjustable weights which oppose the movement between the cylinder and piston produced by the pressure in such chamber, said piston being provided with a relief opening which is covered and uncovered by such relative movement, said valve also having a second chamber connected to the first by a restricted passageway and said second chamber being provided with a restricted exit and entrance passageway.

10. A relief valve, comprising a relatively movable cylinder and piston providing between them a chamber by the pressure in which the relative movement is obtained, said piston being provided with a relief opening which is covered and uncovered by such relative movement, and said chamber being provided with a restricted exit and entrance passageway having an intermediate, greatly enlarged portion.

11. A relief valve, comprising a relatively movable cylinder and piston providing between them a chamber by the pressure in which the relative movement is obtained, said piston being provided with a relief opening which is covered and uncovered by such relative movement, said valve having a second chamber connected to the first by a restricted passageway and said second chamber being provided with a restricted entrance and exit passageway, and means for adjusting the effective size of such first-named passageway.

12. A relief valve comprising a relatively movable cylinder and piston providing between them two chambers one of which varies in volume on a variation of the pressure within it and by such variation in volume produces such relative movement, said piston being provided with a relief opening which is covered and uncovered by such relative movement and having a restricted passageway connecting said chamber of variable volume to the other chamber and a restricted entrance and exit passageway for the latter chamber.

13. A relief valve comprising a relatively movable cylinder and piston providing between them two chambers one of which varies in volume on a variation of the pressure within it and by such variation in volume produces such relative movement, said piston being provided with a relief opening which is covered and uncovered by such relative movement and having a restricted passageway connecting said chamber of variable volume to the other chamber and a restricted entrance and exit passageway for the latter chamber, and means for adjusting the effective size of such first passageway.

14. A relief valve comprising a relatively movable cylinder and piston providing between them two chambers one of which varies in volume on a variation of the pressure within it and by such variation in volume produces such relative movement, said piston being provided with a relief opening which is covered and uncovered by such relative movement and having a restricted passageway connecting said chamber of variable volume to the other chamber and a restricted entrance and exit passageway for the latter chamber, and means for adjusting the effective size of such second passageway.

15. A relief valve comprising a relatively movable cylinder and piston providing between them two chambers one of which is of constant volume and the other of which varies in volume on a variation of the pressure within it and by such variation in volume produces such relative movement, said piston being provided with a relief opening which is covered and uncovered by such relative movement and having a restricted passageway connecting said chamber of variable volume to the other chamber and a restricted entrance and exit passageway for the latter chamber.

16. A relief valve comprising a relatively movable cylinder and piston providing between them two chambers one of which is of constant volume and the other of which varies in volume on a variation of the pressure within it and by such variation in volume produces such relative movement, said piston being provided with a relief opening which is covered and uncovered by such relative movement and having a restricted passageway connecting such chamber of variable volume to the other chamber and a restricted entrance and exit passageway for the latter chamber, and means for adjusting the effective size of such first passageway.

17. A relief valve comprising a relatively movable cylinder and piston providing between them two chambers one of which is of constant volume and the other of which varies in volume on a variation of the pressure within it and by such variation in volume produces such relative movement, said piston being provided with a relief opening which is covered and uncovered by such relative movement and having a restricted passageway connecting such chamber of variable volume to the other chamber and a restricted entrance and exit passageway for the latter chamber, and means for adjusting the effective size of such second passageway.

18. A relief valve comprising a relatively movable cylinder and piston providing between them two chambers one of which varies in volume on a variation of the pressure within it and by such variation in volume produces such relative movement, adjustable weights which oppose the movement between the cylinder and piston produced by the pressure in such chamber of variable volume, said piston being provided with a relief opening which is covered and uncovered by such relative movement and having a restricted passageway connecting said chamber of variable volume to the other chamber and a restricted entrance and exit passageway for the latter chamber.

In witness whereof, I have hereunto set my hand and seal at Connersville, Indiana, this twenty-fifth day of September, A. D. one thousand nine hundred and twelve.

CARL ROY HOUGHTON. [L. S.]

Witnesses:
J. E. HUSTON,
JOHN T. WILKIN.